(12) United States Patent
Yue et al.

(10) Patent No.: US 12,289,752 B2
(45) Date of Patent: Apr. 29, 2025

(54) METHOD AND APPARATUS FOR TIMELY SCHEDULING

(71) Applicant: Lenovo (Beijing) Ltd., Beijing (CN)

(72) Inventors: Ran Yue, Haidian District (CN); Lianhai Wu, Chaoyang (CN); Jing Han, Chaoyang District (CN); Haiming Wang, Xicheng District (CN); Jie Shi, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 382 days.

(21) Appl. No.: 17/789,676

(22) PCT Filed: Jan. 8, 2020

(86) PCT No.: PCT/CN2020/070996
§ 371 (c)(1),
(2) Date: Jun. 28, 2022

(87) PCT Pub. No.: WO2021/138850
PCT Pub. Date: Jul. 15, 2021

(65) Prior Publication Data
US 2023/0048889 A1     Feb. 16, 2023

(51) Int. Cl.
| H04W 72/566 | (2023.01) |
| H04W 52/02  | (2009.01) |
| H04W 72/1268 | (2023.01) |
| H04W 72/23  | (2023.01) |
| H04W 76/28  | (2018.01) |

(52) U.S. Cl.
CPC ..... *H04W 72/566* (2023.01); *H04W 52/0216* (2013.01); *H04W 72/1268* (2013.01); *H04W 72/23* (2023.01); *H04W 76/28* (2018.02)

(58) Field of Classification Search
CPC ........... H04W 72/566; H04W 52/0216; H04W 72/1268; H04W 72/23; H04W 76/28; H04W 72/569; H04W 74/0808; Y02D 30/70
See application file for complete search history.

(56) References Cited

U.S. PATENT DOCUMENTS

| 2009/0168731 | A1  | 7/2009 | Zhang et al. |
| 2012/0087341 | A1  | 4/2012 | Jang et al. |
| 2018/0049271 | A1  | 2/2018 | Bagheri et al. |
| 2022/0183051 | A1* | 6/2022 | Fu ........................ H04L 1/1822 |

(Continued)

FOREIGN PATENT DOCUMENTS

| CN | 102548004 A | 7/2012 | |
| CN | 106550439 A | 3/2017 | |
| WO | WO-2019033017 A1 * | 2/2019 | ........... H04L 5/0053 |

OTHER PUBLICATIONS 20911481.8 , "Extended European Search Report", EP Application No. 20911481.8, Sep. 8, 2023, 11 pages.

(Continued)

*Primary Examiner* — Ayanah S George
(74) *Attorney, Agent, or Firm* — FIG. 1 Patents

(57) ABSTRACT

Embodiments of the present application are directed to a method and apparatus for timely scheduling. The method may include: configuring DRX configuration information; and preventing a MAC entity from entering into inactive time in response to that a first MAC PDU is not transmitted in an uplink grant.

20 Claims, 5 Drawing Sheets

(56) References Cited

U.S. PATENT DOCUMENTS

2023/0189390 A1* 6/2023 Park .................. H04W 76/28
                                                    370/252
2024/0057208 A1* 2/2024 Lee .................. H04W 76/38

OTHER PUBLICATIONS

CATT , "Uplink Transmission Enhancements for Power Saving", 3GPP TSG-RAN WG2 Meeting #106, R2-1905667 Resubmission of R2-1903122, Reno, USA [retrieved Nov. 17, 2023]. Retrieved from the Internet <https://www.3gpp.org/ftp/tsg_ran/WG2_RL2/TSGR2_106/Docs>, May 2019, 6 pages.

PCT/CN2020/070996 , "International Preliminary Report on Patentability", PCT Application No. PCT/CN2020/070996, Jul. 21, 2022, 5 pages.

PCT/CN2020/070996 , "International Search Report and Written Opinion", PCT Application No. PCT/CN2020/070996, Sep. 30, 2020, 6 pages.

ZTE , "Enhancement for predictable DRX solution", 3GPP TSG-RAN WG2 Meeting #78, R2-122249, Prague, Czech Republic [retrieved Aug. 3, 2022]. Retrieved from the Internet <https://www.3gpp.org/ftp/tsg_ran/WG2_RL2/TSGR2_78/Docs>., May 2012, 7 Pages.

202080092399.4 , "Foreign Office Action", CN Application No. 202080092399.4, Aug. 28, 2024, 16 pages.

\* cited by examiner

METHOD AND APPARATUS FOR TIMELY SCHEDULING

TECHNICAL FIELD

The present application generally relates to wireless communication technology, and especially to a method and apparatus for timely scheduling an uplink transmission.

BACKGROUND

In a mobile communication field, discontinuous reception (DRX) refers to a working mode for saving power consumption of a user equipment (UE). For example, in the DRX mode, the UE alternates between an active state and a sleep state (or an inactive state). The UE only turns on the receiver to monitor and receive control information or downlink data from a base station (BS) when it is in the active state, and turns off the receiver to stop receiving the control information or downlink data when it is in the sleep state. Therefore, the transmission delay when the UE is in the inactive state may be disadvantage for data transmission, especially for a network requiring low latency, such as ultra-reliable and low latency communications (URLLC) traffic.

URLLC is one of several different types of use cases supported by the 5G NR standard, as stipulated by 3GPP (3rd Generation Partnership Project) Release 15 (R15). URLLC will cater to multiple advanced services for latency-sensitive connected devices, such as factory automation, autonomous driving, the industrial internet and smart grid or robotic surgeries.

SUMMARY OF THE APPLICATION

Embodiments of the present application provide a method and apparatus for timely scheduling an uplink transmission.

An embodiment of the present application provides a method. The method may include: configuring DRX configuration information; and preventing a medium access control (MAC) entity from entering into inactive time in response to that a first MAC protocol data unit (PDU) is not transmitted in an uplink grant.

In an embodiment of the present application, the MAC entity is configured with priorityBasedPrioritization, and the uplink grant in which the first MAC PDU is not transmitted is a de-prioritized grant. In that case, the method may further comprise: transmitting a second MAC PDU in a prioritized uplink grant, while the first MAC PDU is not transmitted. The prioritized uplink grant is a configured grant. The de-prioritized uplink grant is received on a physical downlink control channel (PDCCH) and was addressed to a configured scheduling-radio network temporary identifier (CS-RNTI), and a hybrid automatic repeat request (HARQ) buffer of the identified process is not empty, or the de-prioritized uplink grant is a configured grant.

In an embodiment of the present application, the first MAC PDU is not transmitted in the uplink grant, because listen before talk (LBT) is failed after receiving downlink control information (DCI) which indicates the uplink grant for a retransmission.

In an embodiment of the present application, the DRX configuration information includes a value of drx-RetransmissionTimerUL, wherein preventing the MAC entity from entering into inactive time may comprise: starting the drx-RetransmissionTimerUL for a HARQ process of the second MAC PDU or the first MAC PDU.

In an embodiment of the present application, the DRX configuration information includes a value of drx-HARQ-RTT-TimerUL, wherein preventing the MAC entity from entering into inactive time may comprise: updating and starting the drx-HARQ-RTT-TimerUL for a HARQ process of the second MAC PDU; or updating and/or starting the drx-HARQ-RTT-TimerUL for a HARQ process of the first MAC PDU.

In an embodiment of the present application, updating the drx-HARQ-RTT-TimerUL may comprise: setting the value of the drx-HARQ-RTT-TimerUL for the HARQ process to a value less than the value of drx-HARQ-RTT-TimerUL included in the DRX configuration information or to a value "0".

In an embodiment of the present application, updating the drx-HARQ-RTT-TimerUL may comprise: updating the value of the drx-HARQ-RTT-TimerUL for the HARQ process with a delta value. In an embodiment, updating the value of the drx-HARQ-RTT-TimerUL for the HARQ process with the value of drx-HARQ-RTT-TimerUL—the delta value.

In an embodiment of the present application, the DRX configuration information includes a value of a new round trip time (RTT) timer, wherein the new RTT timer is configured per HARQ process and indicates the minimum duration before an uplink HARQ retransmission grant is expected by the MAC entity.

In an embodiment of the present application, the DRX configuration information includes a value of a new timer, wherein the active time includes the time when the new timer is running.

In an embodiment of the present application, an indication to enable the method is added in the DRX configuration information, or one additional bit for the UE capability, or new MAC control element (CE), or one new DCI, or one additional bit in a current DCI.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can efficiently speed up a retransmission for handling of de-prioritized uplink transmissions especially if the de-prioritized MAC PDU is for URLLC traffic.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
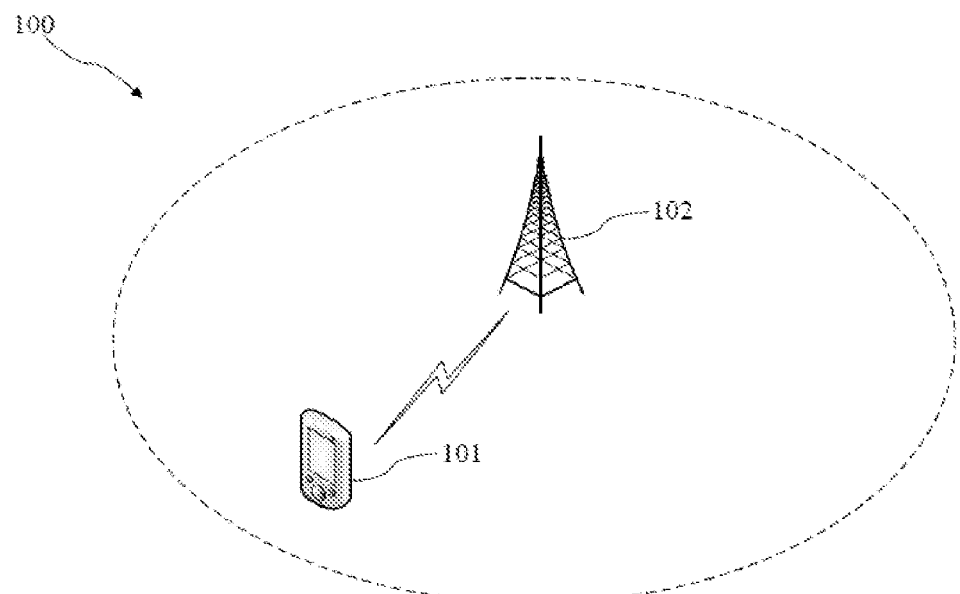
FIG. 1 illustrates a wireless communication system according to some embodiments of the present application.

FIG. 1 illustrates a wireless communication system 100 according to some embodiments of the present application.

Referring to FIG. 1, the wireless communication system 100 may include a UE 101 and a BS 102. Although a specific number of UE 101 and BS 102 are depicted in FIG. 1, it is contemplated that additional UEs 101 and BSs 102 may be available in the wireless communication system 100.

A BS 102 may be distributed over a geographic region, and may communicate with a core network (CN) node. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s) 102.

A UE 101 may directly communicate with the BS 102 via uplink communication signals. The UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In some embodiments of the present application, a UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, industrial Internet-of-Things (IIoT) devices, or the like.

According to some embodiments of the present application, a UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In addition, in some embodiments of the present application, a UE 101 may include, for example, but is not limited to, wearable devices, such as smart watches, fitness bands, optical head-mounted displays, or the like.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE 101 transmit data on the UL using a single-carrier frequency division multiple access (SC-FDMA) or OFDM scheme. More generally, however, the wireless communication system 100 may implement some other open or proprietary communication protocols, for example, WiMAX, WiFi, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with UE 101 using the 3GPP 5G protocols.

The following describes the manner in which UE 101 performs a DRX procedure. When performing DRX, the UE 101 needs to configure the value of timers according to DRX configuration information from the BS 102. For example, the BS 102 may transmit the DRX configuration information by ConnectionReconfiguration or RRCConnection Setup or RRCConnectionReestablishment to the UE 101. The timers may include an on duration timer, an inactivity timer, a HARQ RTT timer, Retransmission Timer, or the like. The value of the timers may be indicated by the number of slots or symbols. For example, the value of the on duration timer can be used to indicate the minimum length of time that the UE remains in the active state after entering the active state. The value of the inactive timer can be used to indicate how long the UE remains active after receiving the scheduling signaling of a physical downlink control channel (PDCCH). The value of the HARQ RTT timer can be used to indicate the minimum amount of round-trip time (TTI)s before a HARQ retransmission is expected by the UE, and while HARQ RTT timer is running, the UE need not monitor PDCCH; and at HARQ RTT timer expiry, UE resumes PDCCH reception. The value of Retransmission Timer can be used to indicate the maximum number of subframes for continuous monitoring of the PDCCH starting from the subframe in which the UE expects to receive a downlink retransmission.

In 3GPP TS38.321, the DRX is specified as follows:

5.7 Discontinuous Reception (DRX)

When a DRX cycle is configured, the Active Time includes the time while:

```
        drx-onDurationTimer or drx-InactivityTimer or drx-RetransmissionTimerDL or
        drx-RetransmissionTimerUL or ra-ContentionResolutionTimer (as described in
        clause 5.1.5) is running; or
        a Scheduling Request is sent on PUCCH and is pending (as described in clause
        5.4.4); or
        a Physical Downlink Control Channel (PDCCH) indicating a new transmission
        addressed to the C-RNTI of the MAC entity has not been received after
        successful reception of a Random Access Response for the Random Access
        Preamble not selected by the MAC entity among the contention-based Random
        Access Preamble (as described in clause 5.1.4).
                                                                    ......omit......
When DRX is configured, the MAC entity shall:
                                                                    ......omit......
1>     if a MAC PDU is transmitted in a configured uplink grant:
           2>              start the drx-HARQ-RTT-TimerUL for the corresponding HARQ process in
                           the first symbol after the end of the first repetition of the corresponding
                           PUSCH transmission;
           2>              stop the drx-RetransmissionTimerUL for the corresponding HARQ process.
                                                                    ......omit......
1>     if the MAC entity is in Active Time:
           2>              monitor the PDCCH as specified in TS 38.213 [6];
                                                                    ......omit......
           2>              if the PDCCH indicates a UL transmission:
                   3>              start the drx-HARQ-RTT-TimerUL for the corresponding HARQ process in
                                   the first symbol after the end of the first repetition of the corresponding
                                   PUSCH transmission;
                   3>              stop the drx-RetransmissionTimerUL for the corresponding HARQ
                                   process.
           2>              if the PDCCH indicates a new transmission (DL or UL):
3>     start or restart drx-InactivityTimer in the first symbol after the end of the
       PDCCH reception.
```

In the 3GPP RAN2 #107 meeting, regarding NR-IIOT, after discussion, some agreements are made as follows:
Data Data Prioritization (with CG):
⇒ same prioritization solution for configured grant (CG) vs CG conflict and CG vs dynamic grant (DG) conflict
⇒ Extend LCP restrictions by allowing restrictive mapping between an LCH and certain CG configurations.
⇒ LCP restriction enhancements for DG to take into account reliability is needed, details FFS.
⇒ no need to define UE processing time in MAC
⇒ The same UE prioritization behaviour should be applied for resource conflicts between new transmissions or a new transmission and a retransmission.
⇒ RAN2 assumes that MAC PDU recovery method in grant prioritization could be reused for PUSCH vs SR conflict.
⇒ The case of highest priorities of two conflicting grants are equal is handled according to the following: for CG DG conflict, DG is prioritized, other cases FFS to what extent to specify.

In the 3GPP RAN2 #108 meeting, regarding NR-IIOT, after discussion, some agreements are made as follows:
UE Autonomous (Re)Transmission:
⇒ The TPs can work, as baseline (maybe some details to fix)
⇒ UE autonomously transmits the de-prioritized PDU as a new transmission in a CG resource from the same CG configuration (FFS different CG configuration)
⇒ The new CG uses the same HARQ process as the deprioritized CG.
⇒ The Aut (re-) transmission feature is optional.
⇒ The case when the next CG resource cannot be used for a retransmission because of UE processing time limitation can occur (no consensus on whether this is a corner case or a mainstream case). Leave the timeline restriction to UE implementation (we don't specify a new number, can specify something).
⇒ UE shall not perform autonomous transmission of the PDU if network has scheduled a retransmission grant for the PDU. FFS whether we specify some time restriction.
LCP Restrictions Enhancements:
⇒ RRC configures a LCH with one or more allowed L1-priority level values (e.g. in an allowedPriorityLevels list) in LogicalChannelConfig (as in the current LCH restrictions), applied at least for mapping to DG, FFS for CG.
Intra-UE Prioritization of Overlapping Grants:
⇒ For CGCG conflicts, and CGDG conflicts, the priority value of an uplink grant (UL-SCH resource) is the highest priority of the LCHs that is multiplexed or can be multiplexed in MAC PDU, taking into account LCH restrictions and data availability.
⇒ If PUCCH resource for an SR's transmission occasion overlaps a UL-SCH resource, SR's transmission is allowed (prioritized) based on a comparison of priority of the LCH that triggered the SR and a priority value for the UL-SCH resource (where the priority value is determined as in previous agreement), if the priority of the LCH that triggered the SR is higher.
⇒ For CG-CG conflict with equal priority, prioritization is up to UE implementation.
⇒ For SR-Data conflict with equal priority, UL-SCH (i.e. data) is prioritized.

In the above agreements, CG is short for configured grant, and DG is short for dynamic grant. 5G networks are expected to support applications demanding URLLC services. To support these kinds of applications, 5G-NR introduces grant free uplink transmission feature, that is, transmission without grant (TWG), or data transmission without resource request. Therefore, once the BS activates the uplink grant to the UE, if the UE does not receive deactivation indication of the uplink grant, it will always use the resources specified by the uplink grant for uplink transmission, in which the uplink grant is the CG. DG is used for dynamic scheduling, and once the UE has data to be transmitted, the BS will transmit an uplink grant to the UE in response to the scheduling request of the UE.

As described in the above agreements, for intra-UE prioritization and multiplexing, the collision scenarios have been identified. In addition, some conclusions related to handling of de-prioritized transmissions have been achieved. For example, the de-prioritized MAC PDU can be scheduled as a retransmission PDU by the network before an autonomous transmission. This can be understood as speeding up retransmission of the de-prioritized MAC PDU.

Figure 2:
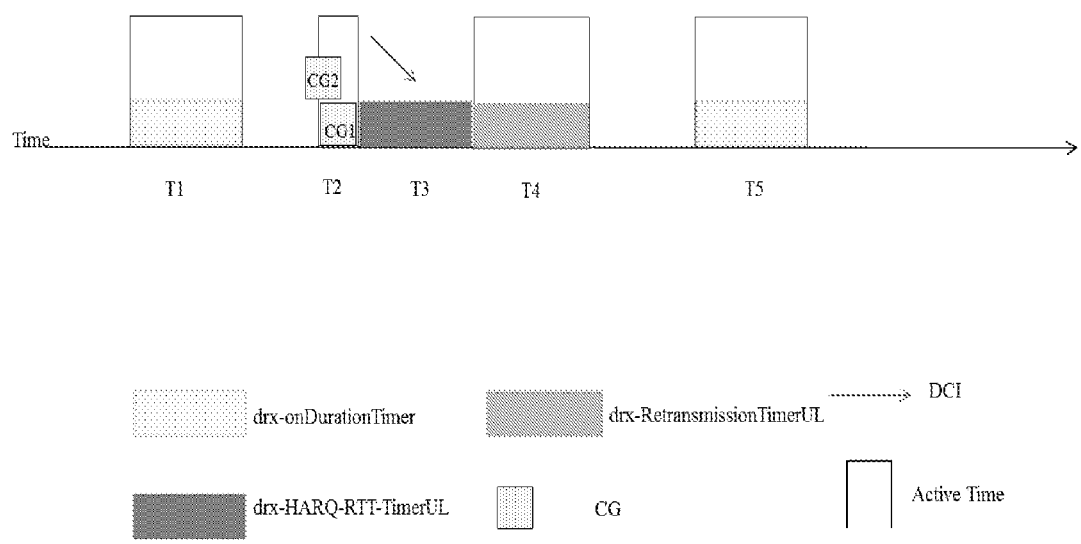
FIG. 2 illustrates an exemplary scenario of a failed scheduling of a de-prioritized MAC PDU according to some embodiments of the present application.

However, such speeding up retransmission could fail because of the impact of DRX in some scenarios. FIG. 2 illustrates an exemplary scenario of a failed scheduling of a de-prioritized MAC PDU according to an embodiment of the present disclosure.

As shown in FIG. 2, a DRX cycle is configured for the UE, in the present application, the UE may include a MAC entity, two MAC entities, or more MAC entities. For convenience of explanation, the following disclosure is described with respect to one MAC entity.

As shown in FIG. 2, in time duration T1, a drx-onDurationTimer is started, and the MAC entity can monitor the PDCCH.

In time duration T2, a CG-CG collision with equal priority occurs. In FIG. 2, CG1 represents a first MAC PDU which is transmitted in a first configured grant, and CG2 represents a second MAC PDU which is transmitted in a second configured grant. The first MAC PDU and the second MAC PDU have the same priority. For example, both of them are for URLLC service. In FIG. 2, the first MAC PDU is a prioritized MAC PDU, and the second MAC PDU is a de-prioritized MAC PDU, and thus the BS may receive the first MAC PDU, and the second MAC PDU is not transmitted. The BS can identify the CG-CG collision. From the perspective of network and QoS of IIOT, it is better for the network to schedule the uplink retransmission for the hybrid automatic repeat request (HARQ) process 2 of the second MAC PDU as fast as possible.

However, as shown in FIG. 2, according to DRX specified in TS38.321, in time duration T3, the drx-HARQ-RTT-TimerUL for HARQ process 1 of the first MAC PDU starts and the drx-RetransmissionTimerUL for HARQ process 1 of the first MAC PDU stops. As a result, the MAC entity enters into inactive time. Even though downlink control information (DCI) for the scheduling of the retransmission for HARQ process 2 of the second MAC PDU is transmitted from the BS, the MAC entity does not monitor the PDCCH and the DCI cannot be received. Thus the MAC entity cannot enter into active time, and the DCI for scheduling the retransmission for HARQ process 2 of the second MAC PDU cannot be received, until the time duration T4 in which the drx-RetransmissionTimerUL starts. Thus the goal of speeding up retransmission for the de-prioritized MAC PDU cannot be achieved in the case as shown in FIG. 2.

In another example, a collision between high priority CG and low priority DG for retransmission may occur. For example, the MAC PDU transmitted in the CG may correspond to a URLLC service, while the MAC PDU transmitted in the DG may correspond to an enhanced Mobile Broadband (eMBB) service. When the MAC PDU transmitted in the CG is received by the BS, the BS can identify the collision between high priority CG and low priority DG for retransmission. That is, the de-prioritized MAC PDU in low priority DG is not transmitted. Thus, the BS would schedule a retransmission for the de-prioritized MAC PDU. However, similar to the case as described and illustrated with reference to FIG. 2, in time duration T3, the MAC entity enters into inactive time. Even though DCI for the scheduling of the retransmission for HARQ process 2 of the de-prioritized MAC PDU in low priority DG is transmitted from the BS, the MAC entity does not monitor the PDCCH and the DCI cannot be received. Thus the goal of speeding up retransmission for the de-prioritized retransmission MAC PDU cannot be achieved.

In yet another example, a collision between DG for retransmission and CG with equal priority may occur. For example, when the MAC PDU transmitted in the DG is received by the BS, the BS can identify the collision. That is, the de-prioritized MAC PDU in CG is not transmitted. Thus, the BS would schedule a retransmission for the de-prioritized MAC PDU. However, similar to the case as described and illustrated with reference to FIG. 2, in time duration T3, the MAC entity enters into inactive time. Even though DCI for the scheduling of the retransmission for HARQ process 2 of the de-prioritized MAC PDU in CG is transmitted from the BS, the MAC entity does not monitor the PDCCH and the DCI cannot be received. Thus the goal of speeding up retransmission for the de-prioritized retransmission MAC PDU cannot be achieved.

Figure 3:
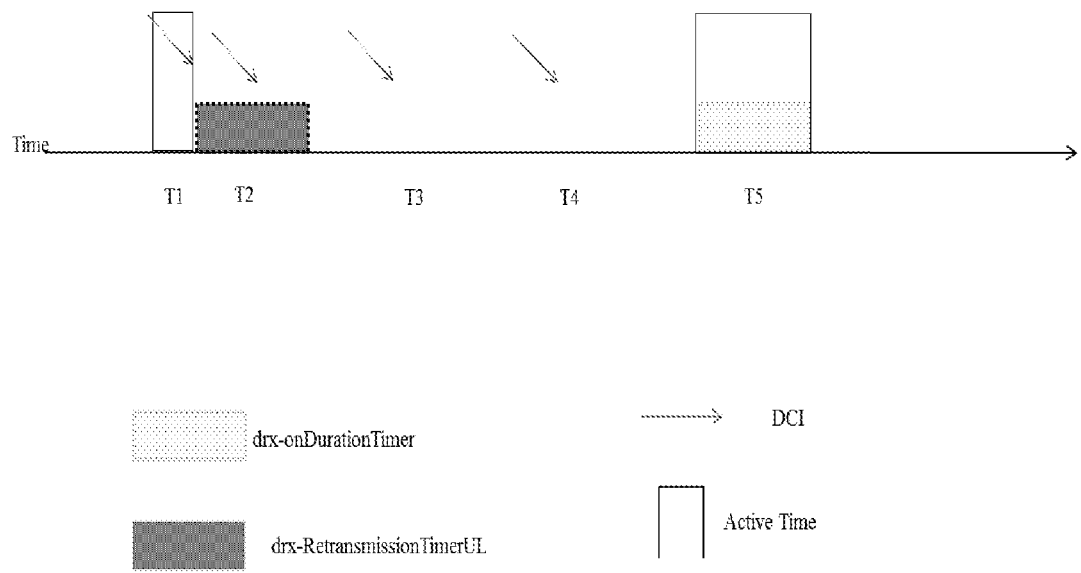
FIG. 3 illustrates another exemplary scenario of a failed scheduling of a URLLC retransmission on an unlicensed spectrum (NR-U) according to some embodiments of the present application.

FIG. 3 illustrates another exemplary scenario of a failed scheduling of a URLLC retransmission on a NR-U according to an embodiment of the present disclosure. URLLC on unlicensed spectrum is suggested as Rel-17 scope of IIOT.

As shown in FIG. 3, in time duration T1, DCI which indicates the uplink grant for an uplink retransmission for the unlicensed spectrum is received by the UE. However, the uplink retransmission on unlicensed spectrum may be blocked because of busy channel (due to, for example, a failed listen before talk (LBT)). In addition, after receiving the DCI, in time duration T2, the drx-RetransmissionTimerUL for the corresponding HARQ process of the uplink retransmission is stopped and the drx-HARQ-RTT-TimerUL for the corresponding HARQ process is not started. Moreover, in time durations T3 and T4, there is no transmission of CG or a scheduling request (SR). As a result, the MAC entity is in inactive time and the PDCCH is not monitored, so that DCI for retransmission cannot be received. The DCI for retransmission may be received in the next drx-onDurationTimer running (in time duration T5).

Therefore, it is necessary to speed up a retransmission for handling of de-prioritized uplink transmissions especially when the de-prioritized MAC PDU is for URLLC traffic (for example, in the case of FIG. 2), and it is necessary to timely schedule the retransmission of blocked uplink transmission especially when it is for URLLC traffic (for example, in the case of FIG. 3).

Figure 4:
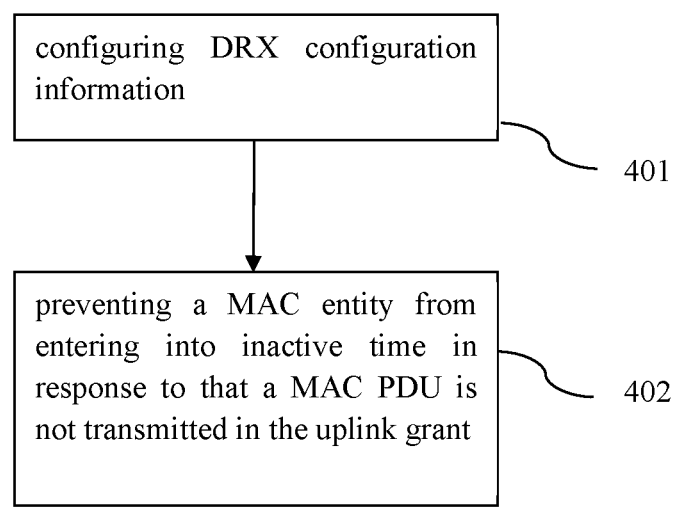
FIG. 4 is a flow diagram illustrating a method for timely scheduling an uplink translation according to some embodiments of the present application.

FIG. 4 is a flow diagram illustrating a method for timely scheduling an uplink translation in accordance with some embodiments of the present application. The method illustrated in FIG. 4 may be implemented by a UE.

As shown in FIG. 4, in step 401, a MAC entity may configure DRX configuration information. Before step 401, the UE may receive the DRX configuration information from the BS, and perform DRX according to the DRX configuration information. The DRX configuration information may include the value of timers, for example, drx-onDurationTimer, drx-InactivityTimer, drx-RetransmissionTimerDL, drx-RetransmissionTimerUL, drx-HARQ-RTT-TimerUL, ra-ContentionResolutionTimer, or the like. Thus the UE may perform DRX according to the value of timers.

In step 402, in response to the fact that a MAC PDU is not transmitted in the uplink grant, the MAC entity is prevented from entering into inactive time.

In order to prevent the MAC entity from entering into inactive time, in some embodiments, the condition for starting the drx-RetransmissionTimerUL is modified.

In some embodiments, DRX configuration information is configured or specifically DRX configuration information is configured with an indication A. In addition, the MAC entity is configured with priorityBasedPrioritization. The indication A may be added in the DRX configuration information, or one additional bit for the UE capability, or new MAC control element (CE), or one new DCI, or one additional bit in a current DCI. Moreover, the indication A may indicate that optimum DRX rules to support prioritization of resource conflict based on priority as a new feature of IIOT WI, and is configurable for backward compatibility and separation from existing texts for UEs not supporting this feature.

In an embodiment, a resource conflict occurs. For example, A MAC PDU (which is hereinafter referred to as "PDU1") is not transmitted in an uplink grant, which is a de-prioritized uplink grant. The de-prioritized uplink grant is received on a PDCCH and was addressed to a CS-RNTI, and a HARQ buffer of the identified process is not empty; while another MAC PDU (hereinafter referred to as "PDU2") is transmitted in a prioritized uplink grant, and the prioritized uplink grant is a configured grant. In order to prevent the MAC entity from entering into inactive time, the MAC entity will start the drx-RetransmissionTimerUL for a HARQ process of the PDU2. For example, the MAC entity starts the drx-RetransmissionTimerUL for the corresponding HARQ process of the PDU2 in the first symbol after the de-prioritized uplink grant received on PDCCH. In another embodiment, in order to prevent the MAC entity from entering into inactive time, the MAC entity will start the drx-RetransmissionTimerUL for a HARQ process of the PDU1. For example, the MAC entity starts the drx-RetransmissionTimerUL for the corresponding HARQ process of the PDU1 in the first symbol after the de-prioritized uplink grant received on PDCCH.

In another embodiment, a resource conflict occurs. For example, PDU1 is not transmitted in an uplink grant, which is a de-prioritized uplink grant. The de-prioritized uplink grant is a configured grant; while PDU2 is transmitted in a prioritized uplink grant, and the prioritized uplink grant is a configured grant. In order to prevent the MAC entity from entering into inactive time, the MAC entity will start the drx-RetransmissionTimerUL for a HARQ process of the PDU2. For example, the MAC entity starts the drx-RetransmissionTimerUL for the corresponding HARQ process of the PDU2 in the first symbol of the de-prioritized uplink grant. In another embodiment, in order to prevent the MAC entity from entering into inactive time, the MAC entity will start the drx-RetransmissionTimerUL for a HARQ process of the PDU1. For example, the MAC entity starts the drx-RetransmissionTimerUL for the corresponding HARQ process of the PDU1 in the first symbol of the de-prioritized uplink grant.

In some embodiments, DRX configuration information is configured in NR-U or DRX configuration information is configured with an indication B. The indication B may be added in the DRX configuration information, or one additional bit for the UE capability, or new MAC control element (CE), or one new DCI, or one additional bit in a current DCI. Moreover, the indication B may indicate that optimum DRX rules in NR-U are configurable for backward compatibility and separation from existing texts for UEs not supporting this feature. In an embodiment, in an uplink transmission, PDU1 is not transmitted in an uplink grant because of a failed LBT after the MAC entity receives the DCI which indicates the uplink grant for a retransmission of PDU1. In order to prevent the MAC entity from entering into inactive time, the MAC entity will start the drx-RetransmissionTimerUL for a HARQ process of the PDU1. For example, MAC entity starts the drx-RetransmissionTimerUL for the corresponding HARQ process of the PDU1 in the first/last symbol of the uplink grant.

In order to prevent the MAC entity from entering into inactive time, in some embodiments, the condition for starting the drx-RetransmissionTimerUL is simply modified.

In some embodiments, DRX configuration information is configured or DRX configuration information is configured with an indication A, and the MAC entity is configured with priorityBasedPrioritization. The indication A may be added in the DRX configuration information, or one additional bit for the UE capability, or new MAC control element (CE), or one new DCI, or one additional bit in a current DCI. Moreover, the indication A may indicate that optimum DRX rules to support prioritization of resource conflict based on priority as a new feature of IIOT WI are configurable for backward compatibility and separation from existing texts for UEs not supporting this feature. In an embodiment, a resource conflict occurs. For example, PDU1 is not transmitted in an uplink grant, which is a de-prioritized uplink grant, while PDU2 is transmitted in a prioritized uplink grant. The de-prioritized uplink grant is received on a PDCCH and was addressed to a CS-RNTI, and a HARQ buffer of the identified process is not empty, or the de-prioritized uplink grant is a configured grant. In order to prevent the MAC entity from entering into inactive time, the MAC entity will start the drx-RetransmissionTimerUL for a HARQ process of the PDU2. In another embodiment, in order to prevent the MAC entity from entering into inactive time, the MAC entity will start the drx-RetransmissionTimerUL for a HARQ process of the PDU1.

In order to prevent the MAC entity from entering into inactive time, in some embodiments, the drx-HARQ-RTT-TimerUL per HARQ process is updated or configured. In some embodiments, the value of drx-HARQ-RTT-TimerUL can be described as indicating "Value in number of symbols of the bandwidth part (BWP) where the transport block was transmitted. If an indication A is indicated, the value can be modified per HARQ process."

In some embodiments, DRX configuration information is configured or DRX configuration information is configured with an indication A. In addition, the MAC entity is configured with priorityBasedPrioritization. The indication A may be added in the DRX configuration information, or one additional bit for the UE capability, or new MAC control element (CE), or one new DCI, or one additional bit in a current DCI. In addition, the indication A may indicate that optimum DRX rules to support prioritization of resource conflict based on priority as a new feature of IIOT WI are configurable for backward compatibility and separation from existing texts for UEs not supporting this feature. In an embodiment, PDU1 is not transmitted in an uplink grant, which is a de-prioritized uplink grant. Moreover, the de-prioritized uplink grant is received on a PDCCH and was addressed to a CS-RNTI, and a HARQ buffer of the identified process is not empty, or the de-prioritized uplink grant is a configured grant, while PDU2 is transmitted in a prioritized uplink grant and the prioritized uplink grant is a configured grant. In order to prevent the MAC entity from entering into inactive time, in an embodiment, the MAC entity will set the value of the drx-HARQ-RTT-TimerUL for the HARQ process of the PDU2 to a value smaller than the value of drx-HARQ-RTT-TimerUL included in the DRX configuration information or to a value "0", and start the drx-HARQ-RTT-TimerUL for the HARQ process of the PDU2, for example start the drx-HARQ-RTT-TimerUL for the HARQ process of the PDU2 in the first symbol after the end of the first repetition of the corresponding prioritized PUSCH transmission. The drx-HARQ-RTT-TimerUL for the corresponding HARQ process is set back to the value configured by RRC when this HARQ process is completed.

Alternatively, in another embodiment, the MAC entity will start the drx-HARQ-RTT-TimerUL for the HARQ process of the PDU1. For example, the MAC entity starts the drx-HARQ-RTT-TimerUL for the HARQ process of the PDU1 after the uplink grant received on PDCCH or in the first symbol of the configured uplink grant.

In another embodiment, the MAC entity will first set the value of the drx-HARQ-RTT-TimerUL for the HARQ process of the PDU1 to a value smaller than the value of drx-HARQ-RTT-TimerUL included in the DRX configuration information or to a value "0", and then start the drx-HARQ-RCT-TimerUL for the HARQ process of the PDU1. For example, the MAC entity starts the drx-HARQ-RTT-TimerUL for the HARQ process of the PDU1 after the uplink grant received on PDCCH or in the first symbol of the configured uplink grant. The drx-HARQ-RTT-TimerUL for the corresponding HARQ process is set back to the value configured by RRC when the HARQ process is completed.

In some embodiments, DRX configuration information is configured in NR-U or DRX configuration information is configured with an indication B. The indication B may be added in the DRX configuration information, or one additional bit for the UE capability, or new MAC control element (CE), or one new DCI, or one additional bit in a current DCI, and the indication B may indicate that optimum DRX rules in NR-U is configurable for backward compatibility and separation from existing texts for UEs not supporting this feature. In an embodiment, an uplink transmission, for example PDU1 is not transmitted in an uplink grant because of the failed LBT after the MAC entity receives the DCI which indicates the uplink grant for a retransmission of PDU1. In order to prevent the MAC entity from entering into inactive time, the MAC entity will start the drx-HARQ-RTT-TimerUL for the HARQ process of the PDU1. Alternatively, in another embodiment, the MAC entity will first set the value of the drx-HARQ-RTT-TimerUL for the HARQ process of the PDU1 to a value less than the value of drx-HARQ-RTT-TimerUL included in the DRX configuration information or to a value "0", and then start the drx-HARQ-RTT-TimerUL for the HARQ process of the PDU1, for example start the drx-HARQ-RTT-TimerUL for the HARQ process of the PDU1 in the first/last symbol of the uplink grant.

In order to prevent the MAC entity from entering into inactive time, in some embodiments, the drx-HARQ-RTT-TimerUL with a delta value (for example, delta-RTT-TimerUL) for the deprioritized uplink grant is started.

In some embodiments, DRX configuration information is configured or DRX configuration information is configured with an indication A, and the MAC entity is configured with priorityBasedPrioritization. The indication A may be added in the DRX configuration information, or one additional bit for the UE capability, or new MAC control element (CE), or one new DCI, or one additional bit in a current DCI. The indication A may indicate that optimum DRX rules to support prioritization of resource conflict based on priority as a new feature of IIOT WI, is configurable for backward compatibility and separation from existing texts for UEs not supporting this feature. In an embodiment, PDU1 is not transmitted in an uplink grant, which is a de-prioritized uplink grant. The de-prioritized uplink grant is received on a PDCCH and was addressed to a CS-RNTI, and a HARQ buffer of the identified process is not empty, while PDU2 is transmitted in a prioritized uplink grant and the prioritized uplink grant is a configured grant. In order to prevent the MAC entity from entering into inactive time, in an embodiment, the MAC entity will update the drx-HARQ-RTT-TimerUL for the corresponding HARQ process of the PDU1 (or the PDU 2) with drx-HARQ-RTT-TimerUL—delta-RTT-TimerUL (the value of the delta-RTT-TimerUL is included in the DRX configuration information, which is transmitted from the BS), and start the drx-HARQ-RTT-TimerUL for the HARQ process of the PDU1 (or the PDU 2), for example start the drx-HARQ-RTT-TimerUL for the HARQ process of the PDU1 (or the PDU 2) in the first symbol after the uplink grant received on PDCCH.

In another embodiment, PDU1 is not transmitted in an uplink grant, which is a de-prioritized uplink grant, the de-prioritized uplink grant is a configured grant, while PDU2 is transmitted in a prioritized uplink grant and the prioritized uplink grant is a configured grant. In order to prevent the MAC entity from entering into inactive time, in an embodiment, the MAC entity will update the drx-HARQ-RTT-TimerUL for the corresponding HARQ process of the PDU1 (or the PDU 2) with drx-HARQ-RTT-TimerUL—delta-RTT-TimerUL (the value of the delta-RTT-TimerUL is included in the DRX configuration information), and start the drx-HARQ-RTT-TimerUL for the HARQ process of the PDU1 (or the PDU 2), for example start the drx-HARQ-RTT-TimerUL for the HARQ process of the PDU1 (or the PDU 2) in the first symbol of the configured uplink grant.

In some embodiments, DRX configuration information is configured in NR-U or DRX configuration information is configured with an indication B. The indication B may be added in the DRX configuration information, or one additional bit for the UE capability, or new MAC control element (CE), or one new DCI, or one additional bit in a current DCI. The indication B may indicate that optimum DRX rules in NR-U are configurable for backward compatibility and separation from existing texts for UEs not supporting this feature. In an embodiment, an uplink transmission, for example PDU1 is not transmitted in an uplink grant because of the failed LBT after the MAC entity receives the DCI which indicates the uplink grant for a retransmission of PDU1. In order to prevent the MAC entity from entering into inactive time, the MAC entity will update the drx-HARQ-RTT-TimerUL for the corresponding HARQ process of the PDU1 with drx-HARQ-RTT-TimerUL—delta-RTT-TimerUL (the value of the delta-RTT-TimerUL is included in the DRX configuration information), and start the drx-HARQ-RTT-TimerUL for the HARQ process of the PDU1, for example start the drx-HARQ-RTT-TimerUL for the HARQ process of the PDU1 in the first/last symbol of the corresponding uplink grant.

In order to prevent the MAC entity from entering into inactive time, in some embodiments, the drx-HARQ-RTT-TimerUL is simply updated with a delta value.

In some embodiments, DRX configuration information is configured or specifically DRX configuration information is configured with an indication A. In addition, the MAC entity is configured with priorityBasedPrioritization. The indication A may be added in the DRX configuration information, or one additional bit for the UE capability, or new MAC control element (CE), or one new DCI, or one additional bit in a current DCI. Moreover, the indication A may indicate that optimum DRX rules to support prioritization of resource conflict based on priority as a new feature of IIOT WI, and is configurable for backward compatibility and separation from existing texts for UEs not supporting this feature. In an embodiment, for example, PDU1 is not transmitted in an uplink grant, which is a de-prioritized uplink grant, while PDU2 is transmitted in a prioritized uplink grant. The de-prioritized uplink grant is received on a PDCCH and was addressed to CS-RNTI, and a HARQ buffer of the identified process is not empty, or the de-prioritized uplink grant is a configured grant. In order to prevent the MAC entity from entering into inactive time, the MAC entity will first update the drx-HARQ-RTT-TimerUL for the corresponding HARQ process of the PDU1 (or the PDU 2) with drx-HARQ-RTT-TimerUL—delta-RTT-TimerUL (the value of the delta-RTT-TimerUL is included in the DRX configuration information), and then start the drx-HARQ-RTT-TimerUL for the HARQ process of the PDU1 (or the PDU 2).

In some embodiments, if DRX configuration information is configured with an indication A, and the MAC entity is configured with priorityBasedPrioritization, the value of drx-HARQ-RTT-TimerUL may be configured per HARQ process, and it may be described as indicating "Value in number of symbols of the BWP where the transport block was transmitted. If indication A is indicated, the value is configured per HARQ process."

In some embodiments, if DRX configuration information is configured with an indication B, and a MAC PDU is not transmitted in an uplink grant because of the failed LBT after the MAC entity receives the DCI which indicates the uplink grant for a retransmission of the MAC PDU, the value of drx-HARQ-RTT-TimerUL may be configured per HARQ process, and it may be described as indicating "Value in number of symbols of the BWP where the transport block was transmitted. If indication B is indicated, the value is configured per HARQ process."

In order to prevent the MAC entity from entering into inactive time, in some embodiments, a new RTT timer, for example, a drx-HARQ-RTT-TimerUL-deprioritized, which is for the deprioritized uplink grant, is introduced. The new RTT timer is configured per uplink HARQ process, indicates the minimum duration before an uplink HARQ retransmission grant is expected by the MAC entity, and the uplink HARQ process is not a prioritized HARQ process or the uplink HARQ process is a deprioritized HARQ process.

In some embodiments, DRX configuration information is configured or specifically DRX configuration information is configured with an indication A. In addition, the MAC entity is configured with priorityBasedPrioritization. The indication A may be added in the DRX configuration information, or one additional bit for the UE capability, or new MAC control element (CE), or one new DCI, or one additional bit in a current DCI. Moreover, the indication A may indicate that optimum DRX rules to support prioritization of resource conflict based on priority as a new feature of IIOT WI, and is configurable for backward compatibility and separation from existing texts for UEs not supporting this feature. In an embodiment, for example, PDU1 is not transmitted in an uplink grant, which is a de-prioritized uplink grant. The de-prioritized uplink grant is received on a PDCCH and was addressed to CS-RNTI, and a HARQ buffer of the identified process is not empty, while PDU2 is transmitted in a prioritized uplink grant and the prioritized uplink grant is a configured grant. In order to prevent the MAC entity from entering into inactive time, the MAC entity will start the drx-HARQ-RTT-TimerUL-deprioritized for the corresponding HARQ process of the PDU1, for example, the MAC entity will start the drx-HARQ-RTT-TimerUL-deprioritized for the corresponding HARQ process of the PDU1 in the first symbol after the uplink grant received on PDCCH, or start the drx-HARQ-RTT-TimerUL-deprioritized for the corresponding HARQ process of the PDU1 in the first symbol after the end of the first repetition grant of the corresponding uplink transmission. In another embodiment, for example, PDU1 is not transmitted in an uplink grant, which is a de-prioritized uplink grant, the de-prioritized uplink grant is a configured grant, while PDU2 is transmitted in a prioritized uplink grant and the prioritized uplink grant is a configured grant. In order to prevent the MAC entity from entering into inactive time, the MAC entity will start the drx-HARQ-RTT-TimerUL-deprioritized for the corresponding HARQ process of the PDU 1 in the first symbol of the configured uplink grant. And then if the drx-HARQ-RTT-TimerUL-deprioritized expires, the MAC entity will start a drx-RetransmissionTimerUL for the corresponding HARQ process of the PDU 1 in the first symbol after the expiry of the drx-HARQ-RTT-TimerUL-deprioritized.

In some embodiments, the expected uplink retransmission corresponding to the uplink HARQ process is not transmitted because of the failed LBT after receiving the DCI which indicates the uplink grant for a retransmission. The new RTT timer drx-HARQ-RTT-TimerUL-deprioritized, which is for the deprioritized uplink grant. The new RTT timer is configured per HARQ process and indicates the minimum duration before an uplink HARQ retransmission grant is expected by the MAC entity. In an embodiment, DRX configuration information is configured in NR-U or DRX configuration information is configured with an indication B. The indication B may be added in the DRX configuration information, or one additional bit for the UE capability, or new MAC control element (CE), or one new DCI, or one additional bit in a current DCI. The indication B may indicate that optimum DRX rules in NR-U are configurable for backward compatibility and separation from existing texts for UEs not supporting this feature. In an embodiment, an uplink transmission, for example PDU1 is not transmitted in an uplink grant because of the failed LBT after the MAC entity receives the DCI which indicates the uplink grant for a retransmission of PDU1. In order to prevent the MAC entity from entering into inactive time, the MAC entity will start the drx-HARQ-RTT-TimerUL-deprioritized for the corresponding HARQ process of the PDU 1, for example, start it in the first/last symbol of the corresponding PUSCH grant. And then if the drx-HARQ-RTT-TimerUL-deprioritized expires, the MAC entity will start a drx-RetransmissionTimerUL for the corresponding HARQ process of the PDU 1 in the first symbol after the expiry of the drx-HARQ-RTT-TimerUL-deprioritized.

In order to prevent the MAC entity from entering into inactive time, in some embodiments, the new RTT timer, drx-HARQ-RTT-TimerUL-deprioritized, is simply applied.

In some embodiments, DRX configuration information is configured or specifically DRX configuration information is configured with an indication A. In addition, the MAC entity is configured with priorityBasedPrioritization. The indication A may be added in the DRX configuration information, or one additional bit for the UE capability, or new MAC control element (CE), or one new DCI, or one additional bit in a current DCI. Moreover, the indication A may indicate that optimum DRX rules to support prioritization of resource conflict based on priority as a new feature of IIOT WI, and is configurable for backward compatibility and separation from existing texts for UEs not supporting this feature. In an embodiment, for example, PDU1 is not transmitted in an uplink grant, which is a de-prioritized uplink grant, while PDU2 is transmitted in a prioritized uplink grant. The de-prioritized uplink grant is received on a PDCCH and was addressed to CS-RNTI, and a HARQ buffer of the identified process is not empty, or the de-prioritized uplink grant is a configured grant. In order to prevent the MAC entity from entering into inactive time, the MAC entity will start the drx-HARQ-RTT-TimerUL-deprioritized for a HARQ process of the PDU1. And then if the drx-HARQ-RTT-TimerUL-deprioritized expires, the MAC entity will start a drx-RetransmissionTimerUL for the corresponding HARQ process of the PDU 1 in the first symbol after the expiry of the drx-HARQ-RTT-TimerUL-deprioritized.

In order to prevent the MAC entity from entering into inactive time, in some embodiments, a new timer, for example, drx-InactivityTimer-deprioritized, which is for the deprioritized uplink grant, is introduced. The new timer is configured per uplink HARQ process, and the value of the drx-InactivityTimer-deprioritized may indicate the duration after the occasion in which a deprioritized uplink grant is decided, and is configured per UL HARQ process or per MAC entity.

In the case of introducing drx-InactivityTimer-deprioritized, when a DRX cycle is configured, when the drx-InactivityTimer-deprioritized is running, the MAC entity is considered as in the active time. Namely, in the case of introducing drx-InactivityTimer-deprioritized, when a DRX cycle is configured, the active time may include the time while drx-onDurationTimer or drx-InactivityTimer or drx-InactivityTimer-deprioritized or drx-RetransmissionTimerDL or drx-RetransmissionTimerUL or ra-ContentionResolutionTimer is running.

In an embodiment, DRX configuration information is configured or DRX configuration information is configured with an indication A. In addition, the MAC entity is configured with priorityBasedPrioritization. The indication A may be added in the DRX configuration information, or one additional bit for the UE capability, or new MAC control element (CE), or one new DCI, or one additional bit in a current DCI. Moreover, the indication A may indicate that optimum DRX rules to support prioritization of resource conflict based on priority as a new feature of IIOT WI, and is configurable for backward compatibility and separation from existing texts for UEs not supporting this feature. In an embodiment, for example, PDU1 is not transmitted in an uplink grant, which is a de-prioritized uplink grant. The de-prioritized uplink grant is received on a PDCCH and was addressed to a CS-RNTI, and a HARQ buffer of the identified process is not empty, or the deprioritized uplink grant is a configured grant, while PDU2 is transmitted in a prioritized uplink grant and the prioritized uplink grant is a configured grant. In order to prevent the MAC entity from entering into inactive time, the MAC entity will start the drx-InactivityTimer-deprioritized for the corresponding HARQ process in the first symbol, after the uplink grant is considered as a deprioritized uplink grant or is not considered as a prioritized configured uplink grant. Alternately, in another embodiment, the MAC entity will start the drx-InactivityTimer-deprioritized for the corresponding HARQ process in the first symbol after the de-prioritized MAC PDU including the LCH associated with the allowedprioritylevel equal to 1 or indicating the low priority is stored in the HARQ process. The allowedprioritylevel indicates the priority of the LCH to support prioritization of resource conflict based on priority as a new feature of IIOT WI, is configurable for backward compatibility and separation from existing texts for UEs not supporting this feature.

During the starting of the drx-InactivityTimer-deprioritized, the MAC entity may receive a PDCCH, which indicates a retransmission for the HARQ process, and the previous uplink grant of the MAC PDU in the HARQ buffer is a deprioritized uplink grant, or a new transmission in a configured uplink grant is transmitted and the previous uplink grant of the MAC PDU in the HARQ buffer is a deprioritized uplink grant, and then the MAC entity will stop the drx-InactivityTimer-deprioritized for the corresponding HARQ process in the first symbol after the de-prioritized MAC PDU in the HARQ process is transmitted.

In some embodiments, the expected uplink retransmission corresponding to the uplink HARQ process is not transmitted because of the failed LBT after receiving the DCI which indicates the uplink grant for a retransmission. The new timer drx-InactivityTimer-deprioritized, which is for the deprioritized uplink grant. The value of the drx-InactivityTimer-deprioritized may indicate the duration after the occasion in which a deprioritized uplink grant is decided, and is configured per uplink HARQ process or per MAC entity.

In some embodiments, in the case of introducing drx-InactivityTimer-deprioritized, when a DRX cycle is configured and DRX configuration information is configured in NR-U or DRX configuration information is configured with an indication B. The active time may include the time while drx-onDurationTimer or drx-InactivityTimer or drx-InactivityTimer-deprioritized or drx-RetransmissionTimerDL or drx-RetransmissionTimerUL or ra-ContentionResolutionTimer is running. The indication B may be added in the DRX configuration information, or one additional bit for the UE capability, or new MAC control element (CE), or one new DCI, or one additional bit in a current DCI. The indication B may indicate that optimum DRX rules in NR-U are configurable for backward compatibility and separation from existing texts for UEs not supporting this feature. In an embodiment, an uplink transmission, for example PDU1 is not transmitted in an uplink grant because of the failed LBT after the MAC entity receives the DCI which indicates the uplink grant for a retransmission of PDU1. In order to prevent the MAC entity from entering into inactive time, the MAC entity will start the drx-InactivityTimer-deprioritized for the corresponding HARQ process of PDU1 in the first/last symbol of the corresponding uplink grant.

During the starting of the drx-InactivityTimer-deprioritized, the MAC entity may receive a PDCCH, which indicates a retransmission for the previous failed transmission, and then the MAC entity will stop the drx-InactivityTimer-deprioritized for the corresponding HARQ process in the first symbol after the previous failed MAC PDU (because of the LBT failure) in the HARQ process is transmitted.

Therefore, through the above described embodiments, the scheduling retransmission can be speeded up or allowed even though a collision or a failed uplink transmission occurs.

In the above description, although indication A or indication B is described, it should be understood that indication A or indication B can be called other names.

Figure 5:
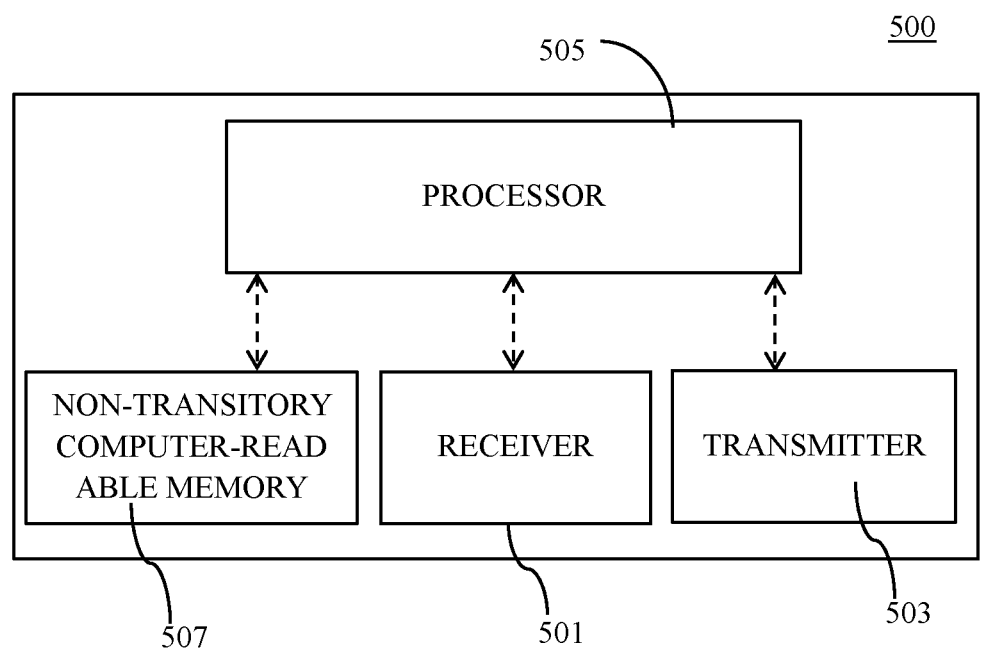
FIG. 5 illustrates an apparatus according to some embodiments of the present application.

FIG. 5 illustrates an apparatus according to some embodiments of the present application. In some embodiments of the present disclosure, the apparatus 500 may be a UE 101 as illustrated in FIG. 1 or other embodiments of the present application.

As shown in FIG. 5, the apparatus 500 may include a receiver 501, a transmitter 503, a processor 505, and a non-transitory computer-readable medium 507. The non-transitory computer-readable medium 507 has computer executable instructions stored therein. The processor 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
   receiving signaling that indicates an uplink grant for a retransmission, wherein a medium access control (MAC) entity associated with the UE is in an active state during the uplink grant based at least in part on discontinuous reception (DRX) configuration information;
   canceling transmission of a MAC protocol data unit (PDU) in the uplink grant based at least in part on a listen before talk (LBT) procedure failure; and
   maintaining, responsive to canceling the transmission of the MAC PDU in the uplink grant, the MAC entity associated with the UE in the active state independent of the DRX configuration information.

2. The method of claim 1, wherein the MAC entity associated with the UE is configured with priorityBasedPrioritization, and wherein the uplink grant is a de-prioritized uplink grant, and the method further comprises:
   transmitting an additional MAC PDU in a prioritized uplink grant based at least in part on canceling the transmission of the MAC PDU.

3. The method of claim 2, wherein the prioritized uplink grant is a configured grant.

4. A user equipment (UE) for wireless communication, comprising:
   at least one memory; and
   at least one processor coupled with the at least one memory and configured to cause the UE to:
      receive signaling that indicates an uplink grant for a retransmission, wherein a medium access control (MAC) entity associated with the UE is in an active state during the uplink grant based at least in part on discontinuous reception (DRX) configuration information;
      cancel transmission of a MAC protocol data unit (PDU) in the uplink grant based at least in part on a listen before talk (LBT) procedure failure; and
      maintain, responsive to canceling the transmission of the MAC PDU in the uplink grant, the MAC entity associated with the UE in the active state independent of the DRX configuration information.

5. The UE of claim 4, wherein the MAC entity associated with the UE is configured with priorityBasedPrioritization, and the uplink grant is a de-prioritized uplink grant, and the at least one processor is configured to cause the UE to:
   transmit an additional MAC PDU in a prioritized uplink grant based at least in part on canceling the transmission of the MAC PDU.

6. The UE of claim 5, wherein the signaling is associated with a physical downlink control channel (PDCCH) addressed with a configured scheduling-radio network temporary identifier (CS-RNTI), and wherein a hybrid automatic repeat request (HARQ) buffer is not empty.

7. The UE of claim 5, wherein the uplink grant is a configured grant.

8. The UE of claim 5, wherein the prioritized uplink grant is a configured grant.

9. The UE of claim 5, wherein the DRX configuration information comprises a retransmission timer, and wherein to maintain the MAC entity associated with the UE in the active state, the at least one processor is configured to cause the UE to:
   start the retransmission timer for a hybrid automatic repeat request (HARQ) process of the additional MAC PDU or the MAC PDU.

10. The UE of claim 5, wherein the DRX configuration information comprises a hybrid automatic repeat request (HARQ) round-trip-time (RTT) timer, and wherein to maintain the MAC entity associated with the UE in the active state, the at least one processor is configured to cause the UE to:

start the HARQ RTT timer for a HARQ process of the additional MAC PDU; or
start the HARQ RTT timer for a HARQ process of the MAC PDU.

11. The UE of claim 10, wherein the at least one processor is further configured to cause the UE to:
set a value of the HARQ RTT timer for the HARQ process of the additional MAC PDU or the HARQ process of the MAC PDU to less than the HARQ RTT timer in the DRX configuration information or to zero.

12. The UE of claim 10, wherein the at least one processor is further configured to cause the UE to:
set a value of the HARQ RTT timer for the HARQ process of the additional MAC PDU or the HARQ process of the MAC PDU with a delta value.

13. The UE of claim 12, wherein the at least one processor is further configured to cause the UE to:
set the value of the HARQ RTT timer for the HARQ process of the additional MAC PDU or the HARQ process of the MAC PDU with a difference between the HARQ RTT timer and the delta value.

14. The UE of claim 4, wherein the DRX configuration information comprises a new round trip time (RTT) timer, wherein the new RTT timer is configured per HARQ process and indicates a minimum duration before an uplink HARQ retransmission grant is expected by the MAC entity associated with the UE.

15. The UE of claim 4, wherein the DRX configuration information comprises a new timer, wherein the UE is in the active state when the new timer is running.

16. The UE of claim 4, wherein at least one of the DRX configuration information, capability signaling, a MAC control element (CE), or downlink control information (DCI) indicates for the UE to maintain the MAC entity associated with the UE in the active state.

17. A processor for wireless communication, comprising:
at least one controller coupled with at least one memory and configured to cause the processor to:
receive signaling that indicates an uplink grant for a retransmission, wherein a medium access control (MAC) entity associated with the processor is in an active state during the uplink grant based at least in part on discontinuous reception (DRX) configuration information;
cancel transmission of a MAC protocol data unit (PDU) in the uplink grant based at least in part on a listen before talk (LBT) procedure failure; and
maintain, responsive to canceling the transmission of the MAC PDU in the uplink grant, the MAC entity associated with the processor in the active state independent of the DRX configuration information.

18. The processor of claim 17, wherein the MAC entity associated with the processor is configured with priority-BasedPrioritization, and wherein the uplink grant is a de-prioritized uplink grant, and the at least one controller is further configured to cause the processor to:
transmit an additional MAC PDU in a prioritized uplink grant based at least in part on canceling the transmission of the MAC PDU.

19. The processor of claim 18, wherein signaling is associated with a physical downlink control channel (PDCCH) addressed with a configured scheduling-radio network temporary identifier (CS-RNTI), and wherein a hybrid automatic repeat request (HARQ) buffer is not empty.

20. The processor of claim 18, wherein the prioritized uplink grant is a configured grant.

* * * * *